Patented Feb. 19, 1929.

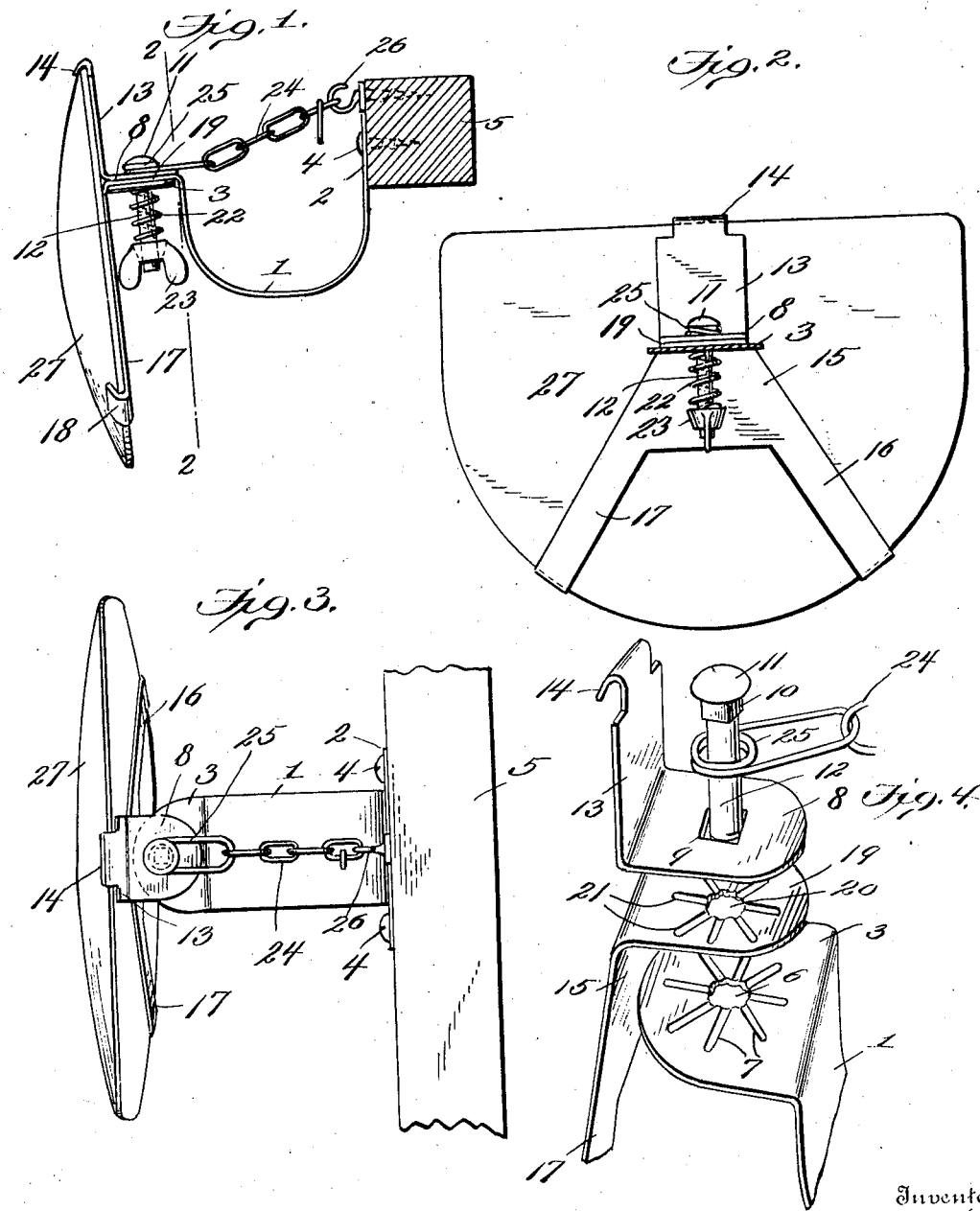

1,703,059

UNITED STATES PATENT OFFICE.

FRANK D. CARPENTER, OF CONCORD, NEW HAMPSHIRE, ASSIGNOR, BY DIRECT AND MESNE ASSIGNMENTS, OF ONE-HALF TO ARTHUR H. HOUGH, OF CONCORD, NEW HAMPSHIRE, AND ONE-HALF TO HIMSELF.

MIRROR FOR AUTOMOBILES.

Application filed March 15, 1927. Serial No. 175,572.

This invention relates to improvements in rear view mirrors for automobiles, and more particularly to a bracket construction for supporting the mirror in adjusted and locked position.

An object of the invention is to provide a rear view mirror for automobiles, which is so constructed that a driver may see equally well to the sides of an automobile, as to the rear thereof.

A further object of the invention is to provide a resilient support for a rear view mirror for automobiles which is adapted to cooperate with a plurality of angled mirror-supporting arms to lock the mirror in the desired adjusted position.

A still further object of the invention is to provide a resilient mirror support for automobiles, having a cooperating bracing means for holding the mirror in fixed position.

Other objects will appear as the description proceeds.

In the accompanying drawings, which form a part of my application:—

Figure 1 is a side elevation of my improved automobile mirror and supporting bracket therefor;

Figure 2 is a sectional view taken on the line 2—2 of Figure 1;

Figure 3 is a plan view of the mirror and supporting bracket; and

Figure 4 is a detail view of the cooperating locking portions of the supporting bracket and the mirror-engaging arms.

Like characters of reference are used throughout the following specification and the accompanying drawings to designate corresponding parts.

The mirror supporting bracket 1 is formed of resilient material and is of substantially U-shape, and is provided with a pair of oppositely disposed laterally extending attaching arms 2 at one end, and with an outwardly extending shoulder 3 at its opposite end. A plurality of screws 4 extend through openings in the arms 2, and into the frame strip 5 of the automobile to firmly position the supporting bracket 1. An opening 6 is formed through the shoulder 3 and receives a locking bolt, later to be described. A plurality of raised tongues 7 are formed on the upper surface of the shoulder 3, and extend radially from the opening 6 therein. The upper mirror-engaging arm comprises an upwardly extending body portion 13 having at its upper end a forwardly and downwardly extending mirror-engaging finger 14 and having at its lower end a shoulder portion 8 of approximately the same size as the shoulder 3 extending at substantially a right angle to the body portion 13 and in a plane parallel to the shoulder 3 of the mirror supporting bracket 1, when in operative assembled position. A square opening 9 is formed in the center of the shoulder 8 of the upper mirror-engaging arm to receive the square shank portion 10 of the locking bolt 12 adjacent the head of the latter. The lower surface of the shoulder 8 is also provided with a plurality of raised tongues which extend radially from the square opening 9.

The lower mirror-supporting arm 15 is formed with a pair of diverging branches 16 and 17, which, in turn, are bent outwardly and upwardly to form mirror-engaging fingers 18. A shoulder 19 is formed integrally on the opposite end of the arm 15 at substantially a right angle to the latter and is of approximately the same size as the shoulders 3 and 8, and is adapted to lie between said last-mentioned shoulders when the several parts are in assembled relation. A centrally disposed opening 20 is formed in the shoulder 19 and is alined with the openings 6 and 9 when the locking bolt 12 is passed through the several openings. A plurality of radially extending grooves 21 are formed in the upper and lower surfaces of the shoulder 19, and extend outwardly from the opening 20. It will be seen that, when the shoulders 3, 8 and 19 are placed together, the tongues on the shoulders 3 and 8 will be received in the grooves in the shoulder 19, thereby holding the several parts assembled.

A coil spring 22 surrounds the lower end of the bolt 12 below the shoulder 3, and a wing nut 23 is mounted on the threaded end of the said bolt, thereby placing a resilient tension on the several shoulders.

A double loop link 25 at one end of a chain 24 is positioned about the square portion 10 of the bolt 12, and is securely held thereon, due to the tension of the spring 22. The opposite end of the chain 24 is passed over the hook member 26 inserted in the frame strip 5 above the arms 2 of the bracket 1. It will be apparent that any desired adjustment of the mirror may be had, by merely engaging one of the links of the chain 24 over the hook 26.

My improved mirror 27 is provided with a convex reflecting surface, thereby enabling the driver to see in a rearward direction, and also at the opposite sides of the automobile and at all angles therebetween. It will, therefore, be unnecessary to look from one side to the other when approaching a street intersection, as a clear view will be had by glancing into the convex surface of the mirror. The mirror 27 may be made with a concave back or with a flat back, as desired, and can be made of any contour.

Many mirror changes in detail of construction may be resorted to without departure from the spirit of the invention.

I claim:—

1. An adjustable support for mirrors, including a resilient support substantially U-shaped in edge view, said resilient support having attaching means at one end and an apertured forwardly extending portion at its other end, a mirror supporting arm comprising an apertured part positioned against the forwardly extending portion of said U-shaped support with its aperture in alignment with the aperture of the latter and a pair of diverging arms extending in the same plane at substantially a right angle to said apertured part, each of said arms having mirror engaging means at its free end, a mirror engaging member substantially L-shaped in edge view having mirror engaging means at the free end of its vertical member and having an aperture in its base member, said base member positioned upon the apertured part of the mirror supporting arm with its aperture in alignment with the aperture of the latter, and clamping means including a member extending through said aligned apertures and a spring associated with said clamping member and one of said apertured parts for clamping said parts together.

2. An adjustable support according to claim 1 including a chain member having one end attached to the clamping member and its links selectively engageable with a fixed fastening adjacent the attaching means of the resilient support.

In testimony whereof I have hereunto set my hand.

FRANK D. CARPENTER.